United States Patent
Bantukul et al.

(10) Patent No.: US 7,079,524 B2
(45) Date of Patent: Jul. 18, 2006

(54) METHODS AND SYSTEMS FOR OFF-LOADING A-INTERFACE SHORT MESSAGE SERVICE (SMS) MESSAGE TRAFFIC IN A WIRELESS COMMUNICATIONS NETWORK

(75) Inventors: Apirux Bantukul, Cary, NC (US); Venkataramaiah Ravishankar, Apex, NC (US); Peter J. Marsico, Carrboro, NC (US)

(73) Assignee: Tekelec, Calabassas, CA (US)

( * ) Notice: Subject to any disclaimer, the term of this patent is extended or adjusted under 35 U.S.C. 154(b) by 1047 days.

(21) Appl. No.: 09/975,657

(22) Filed: Oct. 11, 2001

(65) Prior Publication Data

US 2003/0091020 A1 May 15, 2003

(51) Int. Cl.
- H04J 3/24 (2006.01)
- H04L 12/66 (2006.01)
- H04Q 7/20 (2006.01)

(52) U.S. Cl. .............. 370/349; 370/352; 455/466
(58) Field of Classification Search .............. 370/349, 370/352, 389, 393, 397, 399, 401, 429; 455/460, 455/466

See application file for complete search history.

(56) References Cited

U.S. PATENT DOCUMENTS

| | | | |
|---|---|---|---|
| 5,867,787 A | 2/1999 | Vudali et al. | |
| 5,978,679 A | 11/1999 | Agre | |
| 6,856,808 B1* | 2/2005 | Comer et al. | 455/466 |
| 6,888,823 B1* | 5/2005 | Zaffino | 370/354 |
| 2001/0036174 A1* | 11/2001 | Herring | 370/352 |
| 2002/0075850 A1* | 6/2002 | Cruz et al. | 370/352 |
| 2002/0077131 A1* | 6/2002 | Mizell et al. | 455/466 |
| 2002/0077132 A1* | 6/2002 | Mizell et al. | 455/466 |
| 2005/0170855 A1* | 8/2005 | Comer et al. | 455/466 |

OTHER PUBLICATIONS

Anonymous, "The Challenge of Explosive SMS Growth: Why Choose SMS over IP?," Airslide Systems Ltd., p. 1-22, (2001).

Anonymous, "Airslide Systems 3G IP Convergence for Cellular Network Backbones," Airslide Systems Ltd., p. 1-13, (2001).

Bantukul, "Short Message Service Off-Loading Solution," Tekelec, Inc., p. 1-16, (2001).

"Cisco IP Transfer Point as the Signaling Gateway for the Cisco BTS 10200 Softswitch," Cisco Systems, Inc., pp. 1-10 (Summer 2004).

(Continued)

*Primary Examiner*—Hassan Kizou
*Assistant Examiner*—Hong Sol Cho
(74) *Attorney, Agent, or Firm*—Jenkins, Wilson, Taylor & Hunt, P.A.

(57) ABSTRACT

A signaling message processing and routing node intercepts and routes signaling system 7 (SS7)-based signaling messages received from the base station controller (BSC) component of a base station system (BSS) via an A-interface link interface. The A-interface normally connects a BSC node to a mobile switching center (MSC) node. Upon determining that a signaling message received from a BSC node via an A-interface link is an SMS-related message, the SMS message is routed towards the appropriate destination without involving the MSC node connected to the BSC. The SMS message may be encapsulated within an Internet protocol (IP)-based transport adapter layer interface (TALI) protocol packet and transmitted into an IP network. As a result, MSC resources are conserved.

39 Claims, 9 Drawing Sheets

OTHER PUBLICATIONS

"Cisco IP Transfer Point as the Signaling Gateway for the Cisco PGW 2200 Softswitch," Cisco Systems, Inc., pp. 1-11 (Summer 2004).

"Next-Generation Signaling Transports Cisco IP Transfer Point," Cisco Systems, Inc., pp. 1-27 (Summer 2004).

"A Study in Mobile Messaging: The Evolution of Messaging in Mobile Networks, and How to Efficiently and Effectively Manage the Growing Messaging Traffic," White Paper, Cisco Systems, Inc., pp. 1-6 (Spring 2004).

Walker, "The IP Revolution in Mobile Messaging," PACKET, Cisco Systems Users Magazine, vol. 16, No. 1, pp. Cover; 73-74; and 89 (First Quarter 2004).

"Cisco ITP Multilayer Routing (MLR) SMS MO Routing Requirements," Cisco Systems, Inc., p. 1 (Copyright 2004).

"Cisco Signaling Gateway Manager Release 3.2 For Cisco IP Transfer Point," Cisco Systems, Inc., pp. 1-9 (Copyright 1992-2004).

"Solutions for Mobile Network Operators," Cisco Systems, Inc., pp. 1-8 (Copyright 1992-2004).

Moodie, "Agilent acceSS7: White Paper," Agilent Technologies, pp. 1-14 (Apr. 1, 2003).

"Cisco IP Transfer Point," Cisco Systems, Inc., pp. 1-10 (Copyright 1992-2003).

"Cisco IP Transfer Point Multilayer Short Message Service Routing Solution," Cisco Systems, Inc., pp. 1-6 (Copyright 1992-2003).

"Cisco ITP MAP Gateway for Public WLAN SIM Authentication and Authorization," Cisco Systems, Inc., pp. 1-13 (Copyright 1992-2003).

Barry, "A Signal for Savings," PACKET, Cisco Systems Users Magazine, vol. 14, No. 4, pp. Cover; 19-21; and 81 (Fourth Quarter 2002).

"Agilent Technologies and Cisco Systems SS7 over IP White Paper," Cisco Systems, Inc. and Agilent Technologies, pp. 1-6 (Copyright 2002 - Printed in the UK Feb. 1, 2002).

"Cisco IP Transfer Point: MTP3 User Adaptation (M3UA) and SCCP User Adaptation (SUA) Signaling Gateway," Cisco Systems, Inc., pp. 1-14 (Copyright 2002).

"Cisco SS7 Port Adapter for the Cisco 7500 Versaitile Interface Processor and 7200 VXR Routers Provide High-Density SS7 Aggregation," Cisco Systems, Inc., pp. 1-5 (Copyright 1992-2002).

"Next-Generation SS7 Networks with the Cisco IP Transfer Point," Cisco Systems, Inc., pp. 1-14 (Copyright 1992-2002).

"Agilent acceSS7 Business Intelligence," Agilent Technologies, pp. 1-6 (Copyright 2001 - Printed in the UK Nov. 30, 2001).

"Cisco IP Transfer Point (ITP) Network Management Product Presentation," Cisco Systems, Inc., pp. 1-20 (Copyright 2001).

"Networkers," Cisco Systems, Inc., pp. 1-60 (Copyright 2001).

"Cisco SS7 Signaling Offload," Cisco Systems, Inc., pp. 1-33 (Copyright 1992-2001).

"Topsail Beach - SS7 Over IP -"Cisco Systems, Inc., pp. 1-16 (Copyright 1999).

"Chapter 1: Overview," SS7 Port Adapter Installation and Configuration, pp. 1-1 - 1-8 (Publication Date Unknown).

"Configuring ITP Basic Functionality," IP Transfer Point, Cisco IOS Release 12.2(4)MB12, pp. 31-50 (Publication Date Unknown).

"Configuring ITP Optional Features," IP Transfer Point, Cisco IOS Release 12.2(4)MB12, pp. 65-136 (Publication Date Unknown).

"Configuring M3UA and SUA SS7 Over IP Signaling Gateways," IP Transfer Point, Cisco IOS Release 12.2(4)MB13, pp. 51-66 (Publication Date Unknown).

"Configuring M3UA and SUA SS7 Over IP Signaling Gateways," IP Transfer Point, Cisco IOS Release 12.2(4)MB10, pp. 49-62 (Publication Date Unknown).

\* cited by examiner

METHODS AND SYSTEMS FOR OFF-LOADING A-INTERFACE SHORT MESSAGE SERVICE (SMS) MESSAGE TRAFFIC IN A WIRELESS COMMUNICATIONS NETWORK

TECHNICAL FIELD

The present invention relates to methods and systems for routing short message service messages in a wireless communications network. More particularly, the present invention relates to methods and systems for identifying and off-loading SMS message traffic from an A-interface in a wireless communications network.

BACKGROUND ART

Short message service, which was first introduced by European wireless network operators in 1991, enables mobile subscribers to easily send and receive text messages via wireless handsets. As convergence of wireless communication networks and Internet data networks has increased, the sending and receiving of SMS messages via computer terminals has also become commonplace. Although specifications and industry standards related to SMS are constantly evolving and being modified, SMS messages have traditionally been used to convey readable text information, where the text can includes any combination of alphanumeric characters. After the initial text messaging application, service providers began focusing on using SMS as a means for eliminating alphanumeric pagers by permitting two-way, general purpose messaging and notification services. One early example of SMS service was voice mail notification service. In voice mail notification service, users are sent text messages using short message service to notify the users of the presence of voice mail messages. As technology and networks continued to mature, a variety of services were introduced, including electronic mail (email) and fax integration, paging integration, interactive banking, and information services, such as stock quotes, news highlights, etc.

SMS delivery service provides a mechanism for transmitting "short" messages to and from SMS capable terminals (e.g., wireless handsets, personal digital assistants, personal computers, etc. ) via the signaling component of the wireless communication network. With particular regard to the sending and receiving of SMS messages by a wireless handset, a wireless network provides the transport facilities necessary to communicate short messages between a short message service center (SMSC) and a wireless handset. An SMSC acts as a store and forward platform for short messages. In contrast to earlier text message transmission services, such as alphanumeric paging, SMS technology is designed to provide guaranteed delivery of an SMS message to a destination. That is, if a temporary network failure prohibits the immediate delivery of an SMS message, then the short message is stored in the network (i.e., stored at an SMSC) until the destination becomes available. Another of the key and distinguishing characteristics of SMS service with respect to previously available message communication services is that an active mobile handset is able to transmit or receive a short message at any time, regardless of whether or not a voice or data call is in progress.

SMS can be characterized as an out-of-band packet delivery technique with low per-message bandwidth requirements. Hence, SMS services are appealing to network owners and operators.

FIG. 1 is a network diagram illustrating an SMS implementation in a global system for mobile communication (GSM) wireless network. It will be appreciated that a functionally similar SMS architecture could also be employed in non-GSM wireless networks, such as American National Standards Institute 41 (ANSI-41) wireless networks. In any event, FIG. 1 includes a wireless communication network, generally indicated by reference numeral 100. Wireless network 100 is comprised of a number of components including a sending mobile terminal 110 that formulates and sends SMS message and a base transceiver station 112 base station controller 113 pair that are collectively referred to as a base station system (BSS). A base station system manages the network-to-air interface and reliably transmits SMS messages into the core wireless network. In this particular example, the receiving end of the network includes a base station system 126 and a receiving mobile terminal 128, both of which are functionally similar to the corresponding components on the sending side. Wireless network 100 also includes a pair of mobile switching centers (MSCs) 114 and 124, a pair of signal transfer points (STPs) 116 and 122, a short message service center 118 and a home location register (HLR) 120.

As mentioned above, SMSC 118 is responsible for relaying, storing, and forwarding short messages between sending and receiving SMS terminals. HLR 120 is a database platform used for permanent storage and management of mobile service subscriptions, mobile subscriber profiles, and mobile subscriber location information. HLR databases store information about subscribers that belong to the same network as the HLR. A database element known as a visitor location register (VLR) is used to temporarily store information about subscribers who are currently roaming in the area serviced by that VLR. The VLR may belong to the subscriber's home network or to a foreign network. Typically, VLR databases are integrated within MSC network elements, and, as such, a stand-alone VLR node is not shown in FIG. 1. The HLR and VLR store information needed to correctly route voice calls or data communications to the mobile subscriber. This information may include an international mobile station identification (IMSI), a mobile identification number (MIN), a mobile directory number (MDN), and/or a mobile station ISDN number (MSISDN), as well as the IDs of the VLR and MSC with which the subscriber is currently associated.

With particular regard to short message service operations, HLR 120 provides SMSC 118 with network routing information for the receiving mobile subscriber or mobile terminal 128. In certain cases, HLR 120 may also inform SMSC 118 that a mobile station is now recognized by the mobile network to be accessible after unsuccessful short message delivery attempts to the mobile station.

MSC 114 is sometimes referred to as an SMS interworking MSC (SMS-IWMSC) because it is capable of receiving a short message from a wireless network and transmitting the short message to the appropriate SMSC. In practice, SMS-IWMSC nodes are typically integrated with the SMSCs. In a similar manner, MSC 124 is sometimes referred to as an SMS gateway MSC (SMS-GMSC) because it is capable of receiving a short message from an SMSC, interrogating a home location register for routing information, and delivering the short message to the visited MSC of the recipient mobile station.

Within the Internet domain, email servers may communicate email-originated SMS messages to an SMSC serving subscribers in a wireless communication network. As such, an SMS message may be generated by a wireline computer terminal residing within a data network (e.g., the Internet) and sent to a mobile terminal within a wireless network, and vice versa.

The core signaling infrastructure of wireless network 100 is based on signaling system no. 7 (SS7), a telecommunications industry standard signaling protocol. A detailed discussion of SS7 signaling message types and their associated functions can be found in *Signaling System #7* by Travis Russell, McGraw-Hill Publishing, 1998. Additionally, a detailed discussion of SS7-related signaling within a GSM network can be found in *The GSM System for Mobile Communications* by Michel Mouly and Marie-Bernadette Pautet, Cell & Sys, 1992.

SMS service makes use of the SS7 signaling connection control part (SCCP) and mobile application part (MAP) protocols. Depending upon the particular implementation, SMS service may also utilize the transaction capabilities application part (TCAP) component of the SS7 protocol. With regard to TCAP-based SMS service, both American and international standards bodies have defined a MAP layer using the services of the SS7 TCAP component. The American standard is published by Telecommunication Industry Association and is referred to as ANSI-41, while the international standard is defined by the European Telecommunication Standards Institute and is referred to as GSM MAP.

FIG. 2 is a message flow diagram associated with the sending of a short message (SM) by a mobile subscriber in a GSM wireless network. In step 1, a short message, such as a text message, is originated by sending mobile station 110 and transmitted to base station controller 113. The message used to communicate the short message from sending mobile station 110 to base station controller 113 is a short message relay protocol data (SM-RP-DATA) message contained within a short message control protocol data (SM-CP-DATA) message. In step 2, BSC 113 delivers the CP-DATA message to MSC 114 over an interface referred to as the A-interface. In mobile communications networks, the A-interface is the interface between the BSC and the MSC. In response to receiving the CP-DATA message, MSC 114 formulates a ForwardMOShortMessage message and routes the message to the appropriate short message service center (SMSC) node 118, as indicated in step 3. Upon receiving the ForwardMOShortMessage message, SMSC 118 generates an SM-RP-ACK containing ForwardMOShortMessageResponse message which is routed back to originating MSC 114 (step 4). In response to receiving the ForwardMOShortMessageResponse message, MSC 114 places the SM-RP-ACK component within an SM-CP-DATA message and transmits the message via the A-interface link to originating BSC 113 (step 5) BSC 113 subsequently notifies the originating mobile subscriber that the SMS message was sent (step 6).

As the popularity of SMS messaging increases among wireless (and Internet) subscribers, the amount of wireless signaling traffic that traverses the core mobile signaling network will also increase, given the fact that SMS information is currently communicated via the SS7 signaling component of the wireless network instead of the voice or bearer path. From a bandwidth or signaling resource perspective, SMS traffic competes with other mobile signaling traffic, such as call-setup or location management-related messaging. Such SMS-related increases in the volume of signaling traffic leads to signaling congestion at a variety of signaling points in the mobile signaling network, particularly at mobile switching center nodes.

Conventional solutions to dealing with increased SMS traffic are commonly referred to as SMS-offloading techniques because these techniques off-load SMS traffic from the core signaling network to a data network. However, these conventional solutions do not address increased SMS traffic at MSCs because these solutions only offload SMS traffic downstream from the MSCs. In light of all of the call setup, teardown, and other functions performed by MSCs, there exists a long-felt need for methods and systems for reducing SMS traffic at the MSCs.

DISCLOSURE OF THE INVENTION

According to one aspect, the present invention includes a signaling message routing node that off-loads SMS messages received from the base station controller component of a base station system via the A-interface. The routing node includes a discrimination application for examining signaling messages received via the A-interface and determining whether a received signaling message is a short message service message. In response to determining that a signaling message received from a BSC node via the A-interface is an SMS message, the message is off-loaded from the core mobile SS7 signaling network and routed towards the appropriate destination without involving the MSC node that serves the BSC. In one exemplary implementation, the SMS message may be encapsulated within an Internet protocol (IP)-based transport adapter layer interface (TALI) protocol packet and transmitted into an IP network.

An SMS off-loading routing node of the present invention may also perform the signaling operations necessary to establish, maintain, and release communication channel resources used in the transmission of an SMS message.

Accordingly, it is an object of the present invention to provide a system and method for routing a short message service message to a recipient without involving the mobile switching center serving the mobile subscriber who originated the SMS message.

It is another object of the present invention to reduce the amount of SMS traffic in the core signaling system 7 signaling network component of a mobile communications network by off-loading some or all SMS messages from the core SS7 network to an Internet protocol network.

It is another object of the present invention to reduce the amount of SMS traffic in the core signaling system 7 signaling network component of a mobile communications network by off-loading some or all SMS messages from the core SS7 network to a general packet radio service (GPRS) network.

It is another object of the present invention to provide a system and method for routing a short message service message to a recipient without involving the mobile switching center serving the recipient.

It is another object of the present invention to identify SMS messages on an A-interface link in a wireless communications network and off-load the SMS messages for routing and transmission via an Internet protocol network.

Some of the objects of the invention having been stated hereinabove, other objects will be evident as the description proceeds, when taken in connection with the accompanying drawings as best described hereinbelow.

BRIEF DESCRIPTION OF THE DRAWINGS

A description of the present invention will now proceed with reference to the accompanying drawings of which.

DETAILED DESCRIPTION OF THE INVENTION

Figure 1:
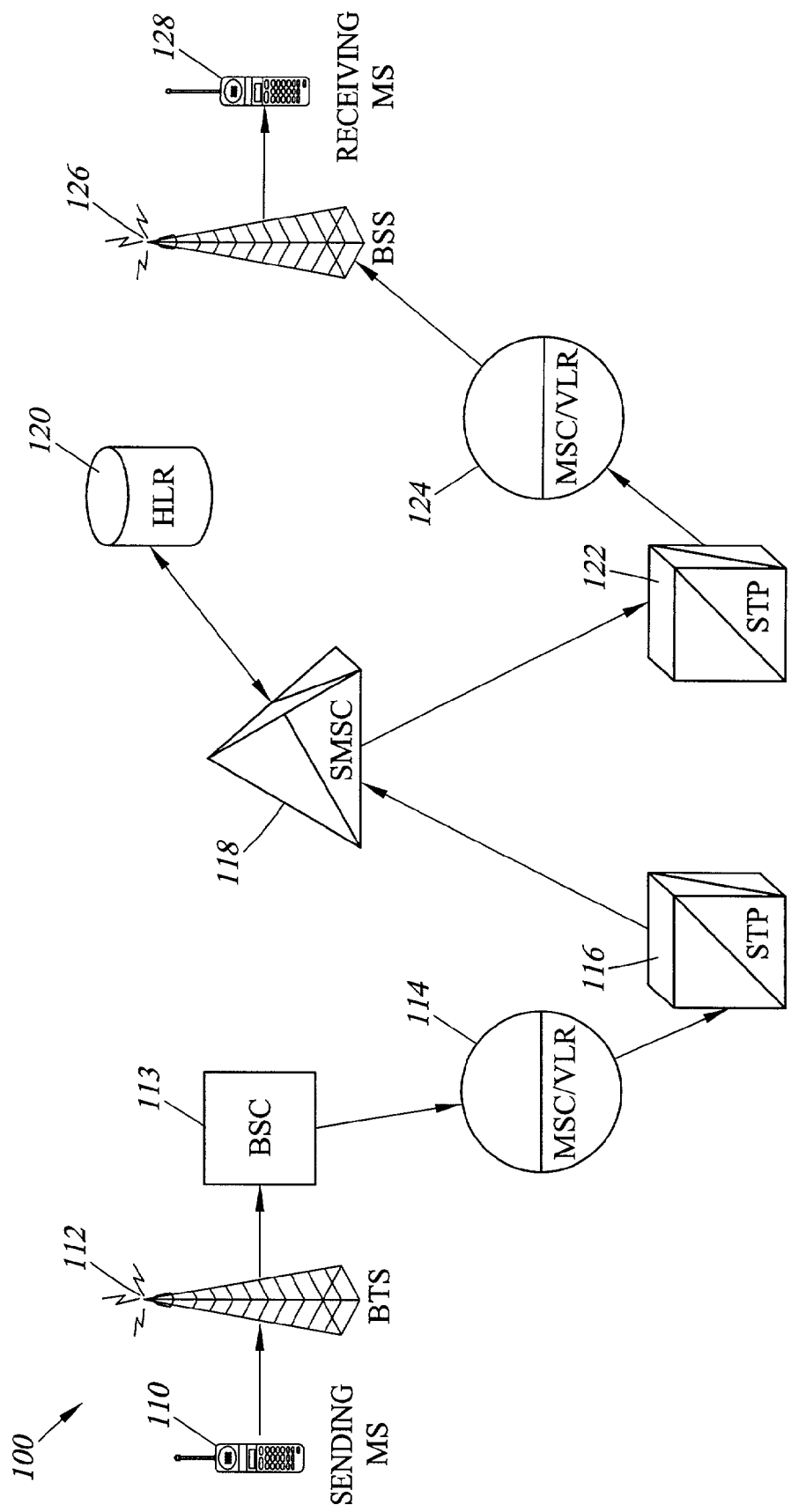
FIG. 1 is a network diagram illustrating network elements associated with SMS service.
Figure 2:
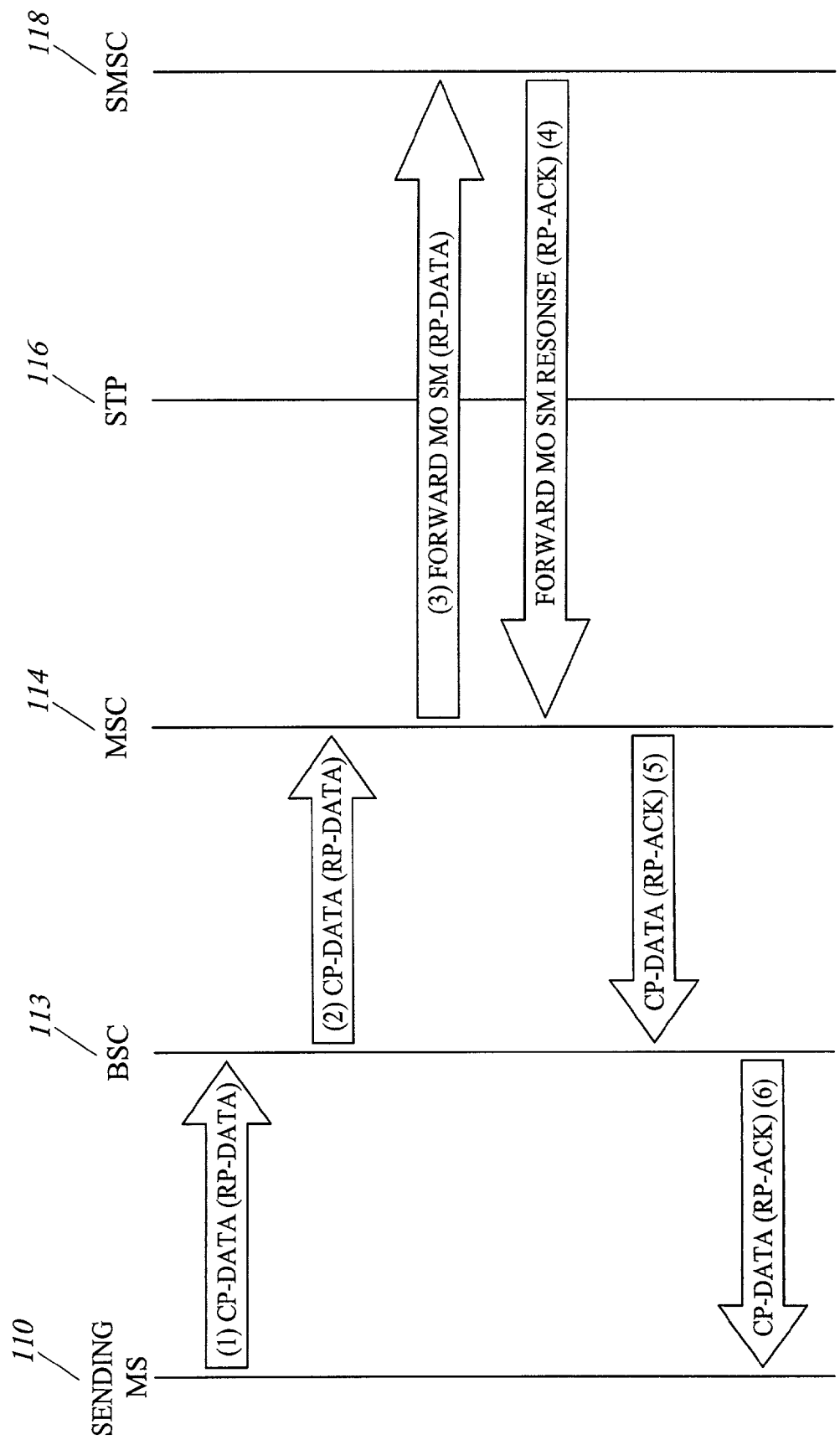
FIG. 2 is a message flow diagram associated with the sending of an SMS message.
Figure 3:
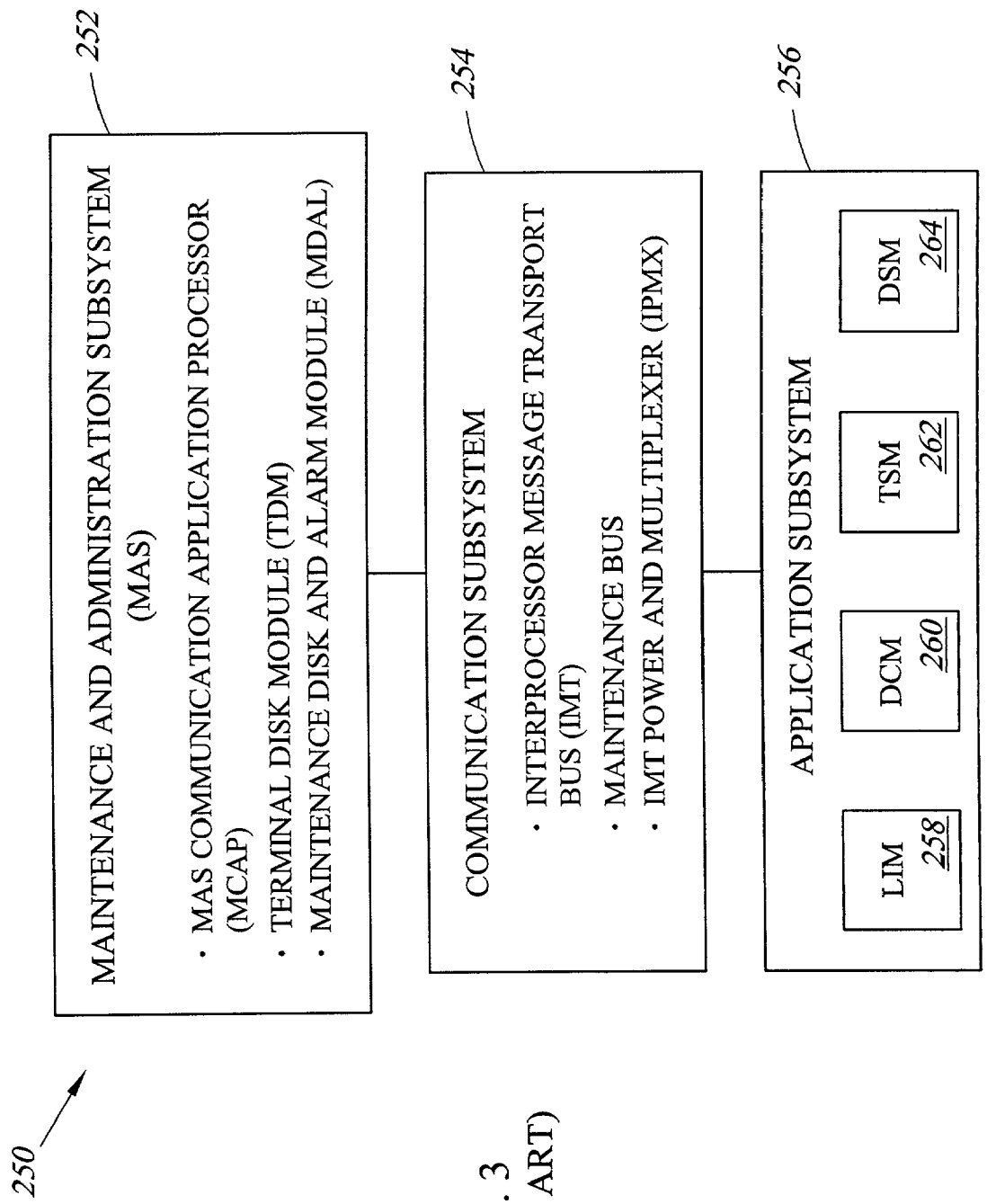
FIG. 3 is block diagram of a signaling gateway routing node suitable for use with embodiments of the present invention.

Disclosed herein are several embodiments of the present invention, some of which may include an underlying hardware platform similar to that of high performance signal transfer point and signaling gateway products are marketed by Tekelec of Calabasas, Calif. as the Eagle® STP and IP7™ Secure Gateway. A block diagram that generally illustrates the base internal architecture of an IP7™ Secure Gateway product is shown in FIG. 3. In FIG. 3, gateway 250 includes the following subsystems: a maintenance and administration subsystem (MAS) 252, a communication subsystem 254, and an application subsystem 256. MAS 252 provides maintenance communications, initial program load, peripheral services, alarm processing, and system disks. Communication subsystem 254 includes an interprocessor message transport (IMT) bus that is the main communication bus among all subsystems in 250. This high-speed communications system includes two 125 Mbps counter-rotating serial rings. Application subsystem 256 includes application cards capable of communicating with the other cards via the IMT bus. SG 250 may include numerous modules, such as: a link interface module (LIM) 258 that provides a signaling system 7 message transfer part (SS7/MTP) signaling interface, a data communication module (DCM) 260 that provides a transport adapter layer interface (TALI) over transmission control protocol/Internet protocol (TCP/IP) signaling interface, and an application service module (ASM) 262 that provides global title translation, gateway screening and other services. A translation service module (TSM) 264 may also be included to support triggered number portability service.

SMS Off-Load Routing Node Architecture

Figure 4:
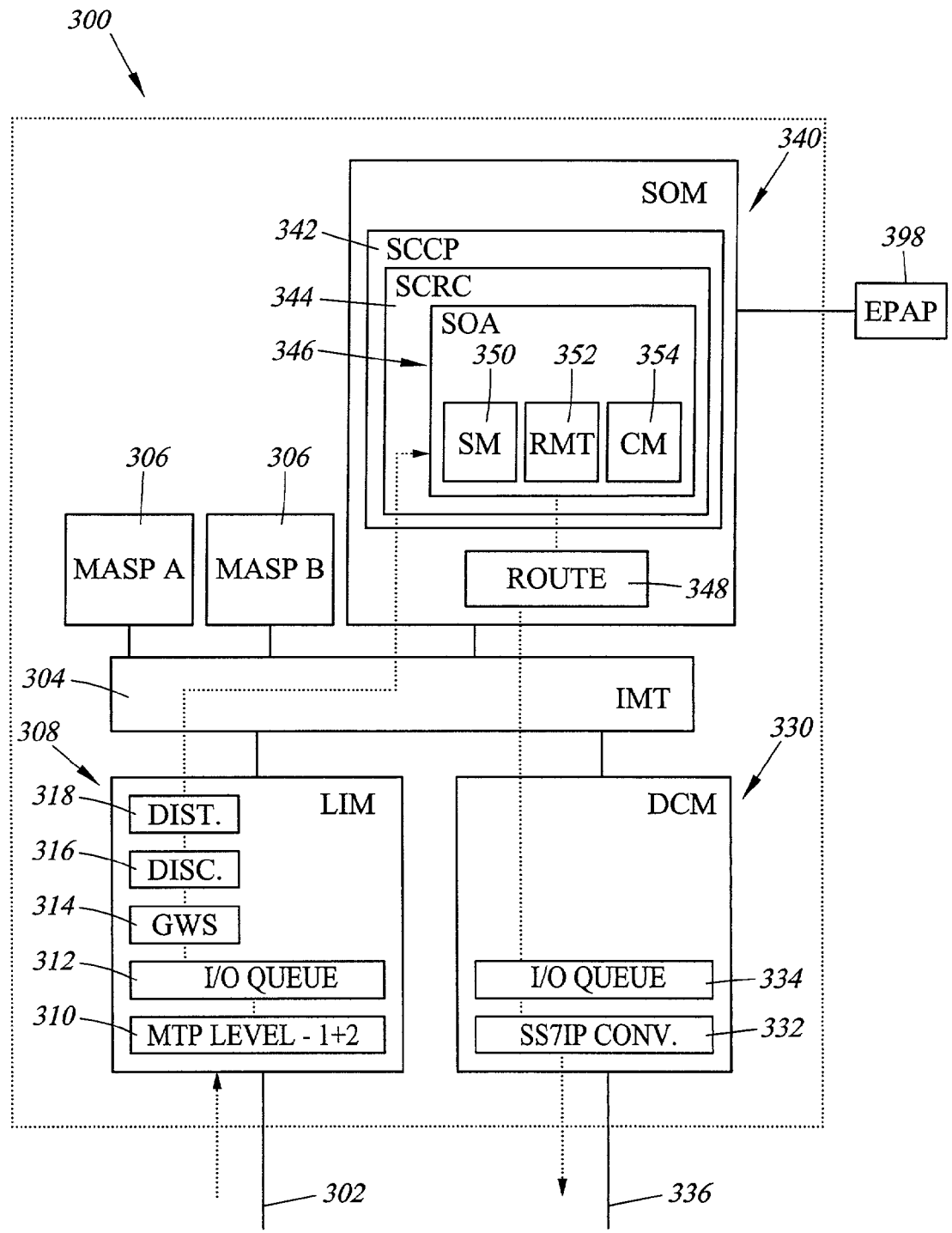
FIG. 4 is a schematic diagram of an SMS off-load routing node including an SMS off-load module (SOM) according to an embodiment of the present invention.

FIG. 4 illustrates an SMS off-load routing node according to an embodiment of the present invention. In FIG. 4, short message service off-load routing node 300 includes an interprocessor message transport bus 304 that is the main communication bus among internal subsystems within the switch or routing node. A number of distributed processing modules or cards may be coupled to IMT bus 304. In FIG. 4, these modules include a pair of maintenance and administration subsystem processors 306, an SS7-capable link Interface module 308, an Internet protocol capable data communication module 330, and an SMS off-load module 340. These modules may be physically connected to IMT bus 304 such that SMS signaling and other type messages may be routed internally between active cards or modules. For simplicity of illustration, only single LIM, DCM, and SOM cards are included in FIG. 4. However, SMO routing node 300 may include multiple LIM, DCM, SOM and other cards, all of which may be simultaneously connected to and communicating via IMT bus 304.

MASP pair 306 provide maintenance communications, initial program load, peripheral services, alarm processing and system disks. As the MASP pair are not particularly relevant to a discussion of SMS off-load application functionality, a detailed discussion of their design and operation is not provided herein.

Focusing now on LIM functionality, in the illustrated embodiment, LIM 308 includes of a number of sub-components, such as an SS7 message transfer part level 1 and 2 application 310, an I/O buffer or queue 312, a gateway screening (GWS) application 314, an SS7 MTP level 3 discrimination application 316, and a distribution application 318. MTP level 1 and 2 application 310 sends and receives digital data over a particular medium and provides error detection, error correction, and sequenced delivery of SS7 message packets.

In the illustrated embodiment, MTP level 1 and 2 application 310 transmits and receives signaling messages via a wireless network A-interface link 302. Such messages may include SCCP messages. I/O queue 312 temporarily buffers incoming and outgoing signaling message packets. GWS application 314 examines received messages and determines whether the messages are to be allowed into the switch for processing and/or routing. Discrimination application 316 performs a discrimination function, effectively determining whether an incoming SS7 message packet requires internal processing or is simply to be through switched, i.e., routed to another node. For example, discrimination application 316 may examine a service indicator octet (SIO) value in a received message packet in order to determine whether the message is an SCCP message and consequently whether SCCP-type processing is required. Distribution application 318 distributes messages that require additional processing prior to final routing.

DCM 330, shown in FIG. 4, includes an SS7/IP converter 332 and an I/O queue 334. SS7/IP converter 332 sends and receives SS7 messages via an IP signaling link 333. I/O queue 334 stores message to be processed by higher and lower layers. Outgoing SS7 message packets routed through DCM 330 may be transmitted out of SMS off-load routing node 300 and into an Internet protocol network via IP signaling link 336. Since the MTP protocol and the IP protocol are not inherently compatible, SS7 message packets that are to be transmitted via an IP network may be encapsulated within an IP routing envelope prior to transmission. In one embodiment, SS7/IP converter 332 performs this IP encapsulation. Exemplary messages that may be transmitted by DCM 330 include transport adapter layer interface protocol messages, session initiation protocol (SIP) messages, M2UA, M3UA, SUA, SCTP or other message types that may be transported via TCP/IP or other IP-based protocols. DCM 330 may also communicate signaling messages via a general packet radio services network. The general packet radio service protocol that may be implemented by DCM 330 may include the General Packet Radio Service described in Digital Cellular Telecommunications System (Phase 2+) (GSM); General Packet Radio Service (GPRS), Service description, Stage 1 TSI EN 301 113 V6.1.1 (1998–11), the disclosure of which is incorporated herein by reference in its entirety.

Preferred packet formats for encapsulating various types of SS7 messages in IP packets are described in IETF RFC 3094, April 2001, the disclosure of which is incorporated herein by reference in its entirety. The present invention is not limited to the above-referenced TALI signaling protocol. Other functionally similar signaling protocols may be employed within the scope of the present invention, including for example, the IETF SUA/M3UA/SCTP or ETSI GPRS protocols.

In general, an SMS SOM card includes applications and databases for performing A-interface SMS off-loading. In FIG. 4, SOM 340 is coupled to and serviced by an external provisioning application platform (EPAP) subsystem 398 via an Ethernet connection. EPAP subsystem 398 is responsible for administration and maintenance of the SMS off-load routing data resident on SOM 340.

SMS Off-Load Module Architecture

In FIG. 4, SOM 340 includes a signaling connection control part application 342. SMS off-load module 340 also includes an SCCP manager or controller known as a signaling connection routing controller (SCRC) 344. The primary function of SCRC 344 includes directing an incoming SCCP message to an SMS off-load application (SOA) 346. SCCP message packets leaving SCRC 344 are received and further processed by a routing application 348. Routing application 348 has access to routing tables and is responsible for the external routing of SS7 message packets that have been processed by SMS off-load application 346 that do not require additional processing by SMS off-load routing node 300. That is, routing application 348 determines to which LIM or DCM an SCCP message should be routed for subsequent outbound transmission from SMS off-load routing node 300 after SMS off-load processing.

As discussed above, SOM card 340 includes one or more data tables that contain information for implementing the SMS off-load functionality of the present invention. Table 1 shown below illustrates a simplified structure intended to illustrate exemplary information that may be used to perform SMS message off-loading according to an embodiment of the present invention.

TABLE 1

SMS Off-load Screening Data

| KEY | DATA |
|---|---|
| SMSC Entity Address | DPC RI |
| 9195555506 | 5-5-5 SSN |
| 9195555507 | 7-5-6 GT |
| 9195555508 | 5-5-7 SSN |

The SMS off-load screening data shown in Table 1 may be accessible by SMS off-load application 346 for performing SMS off-load functions. In Table 1, each entry includes short message service center entity addresses targeted for off-loading and provides a mapping of SMSC entity addresses to valid network addresses or point codes. Each entry in Table 1 also includes a routing indicator. The destination point code to which each SMSC entity address is mapped may correspond to an SMSC in a core mobile SS7 network. In an alternate implementation, the SS7 point code associated with each SMSC entity address may correspond to an intermediate network element, such as a routing node (e.g., signal transfer point, signaling gateway, IP router, etc. ). Depending upon the particular architecture of the network in which SMS off-load routing node 300 is deployed, the network address information stored in Table 1 may correspond to an IP network address (e.g., IP address and port number, URL, or other IP-related address information).

As discussed above, each entry in the SMS off-load data structure illustrated in Table 1 includes an SS7 destination point code and associated routing indicator. The information stored in the DPC and RI fields is used during off-load routing operations to divert SMS messages from the core mobile SS7 signaling network. The routing indicator is used to indicate whether an off-loaded signaling message requires global title translation. In such an embodiment, the presence of a particular SMSC entity address in the data structure shown in Table 1 indicates that an SMS message destined for that SMSC entity is to be off-loaded from the core mobile SS7 signaling network. Additional checks may also be performed to ensure that a received SMS message destined for a provisioned SMSC entity address was originated by an authorized mobile subscriber. For instance, a mobile subscriber that has been ported out of a particular operator's network may retain the ability to originate an SMS message addressed to one of the operator's SMSC. An additional check of the originating mobile subscriber's mobile identifier (e.g., IMSI, TMSI, MSISDN, etc. ) may be used for unauthorized access screening.

A short message generated in a non-SS7 signaling protocol, such as the session initiation protocol, may utilize SMSC entity and mobile subscriber identifiers that differ from those illustrated in Table 1. For example, an SMSC entity address specified in a SIP/SDP SMS message may include an Internet protocol address (e.g., 101.10.12.32), a uniform resource locator (e.g., www.tekelec-SMSC.com), or an electronic mail address (e.g., smsc@mail.tekelec.com). Similarly, a mobile subscriber identifier specified in a SIP/SDP SMS message may include an IP address, uniform resource locator, or electronic mail address for the mobile subscriber. Furthermore, in an embodiment of the invention capable of screening SIP/SDP messages, the destination address information associated with each SMSC entity address and mobile subscriber in the SMS off-load data structure may be an IP network address, uniform resource locator, or electronic mail address that identifies the destination. Any address that can be used to identify a message as an SMS message destined for a core mobile network element, such as an MSC is intended to be within the scope of the invention.

The SMS off-load data structure shown in Table 1 is presented primarily for the purposes of illustration. Practical implementations of an SMS off-load application of the present invention may include more complex or different internal data structures. For example, the SMS off-load data may be stored in a tree or trie data structure to improve lookup efficiency.

SMS off-load module 340 may also include a table or data structure for mapping IMSIs and TMSIs to MSISDN numbers. Table 2 illustrates exemplary IMSI/TMSI to MSISDN mappings that may be stored by SOM 340. The IMSI to MSISDN mapping data shown in Table 2 may be provisioned by a network operator or obtained from other databases residing in the network (e.g., from a home location register, from a visitor location register, etc.) The TMSI mapping information may be dynamically maintained through an external provisioning system or by the SMO routing node itself. In the case where SMS off-load routing node 300 obtains mapping information dynamically, non-SMS related signaling messages, such as Location_Updating_Accept or a TMSI_Reallocation_Command messages, may be intercepted by SMS off-load application 346. SMS off-load application 346 may then extract information for mapping a TMSI to an MSISDN number.

TABLE 2

IMSI/TMSI Mapping Data

| IMSI | TMSI | MSISDN |
|---|---|---|
| 9193620000 | — | 9193457012 |
| 9193620001 | — | 9192600323 |
| 9193620003 | 2348881010 | 9192600032 |

The mappings stored in Table 2 may be used to prevent unauthorized access to an SMSC when a subscriber has been ported from a network having a particular SMSC. For example, a ported subscriber may attempt to send a message using his or her former SMSC. Messages from the subscriber may be identified by MSISDN, TMSI, or IMSI. SMS off-load application 346 may intercept these messages using the data stored in Table 2, and off-load such messages to a data network. The messages may be routed back to their original destinations.

Table 3 shown below illustrates exemplary SMS off-load routing data that may be used by routing application 348 on SMS off-load module 340. In Table 3, each entry includes one or more keys or fields that may be used to index into the routing data. In the illustrated example, the keys include an International Telecommunications Union—international (ITU-I) network point code field, an International Telecommunications Union—national (ITU-N) network point code field, and an American National Standards Institute (ANSI) network point code field. Only one of the provisioned network address fields is accessed during a typical lookup operation. The particular address field selected is determined by the format of the base SS7 protocol employed on the A-interface link being monitored by the SMO routing node.

In Table 3, each entry includes a plurality of routing-related data fields, such as a route cost field, a linkset status field, an adjacent node status field, an overall status field, and a linkset name or identifier. The primary function of the routing data shown in Table 3 is to define one or more signaling routes for a point code and to associate an internal linkset identifier with each defined route.

TABLE 3

SMS Off-load Routing Data

| Keys | | | Route Cost | LinkSet Status | Adjacent Status | Overall Status | Name |
|---|---|---|---|---|---|---|---|
| ITU-I | ITU-N | ANSI | | | | | LS1 |
| 5-5-5 | 2-4-7 | — | 10 | A | A | A | LS2 |
| 5-5-5 | 2-4-7 | — | 20 | P | A | P | LS3 |
| 5-5-5 | 2-4-7 | — | 30 | A | A | A | LS4 |
| 5-5-6 | 2-4-1 | — | 20 | A | P | P | LS5 |
| 5-5-6 | 2-4-1 | — | 30 | A | A | A | LS6 |
| — | — | 5-5-8 | 20 | A | A | A | LS7 |
| — | — | 7-1-1 | 10 | A | A | A | LS8 |

Table 4 shown below illustrates exemplary linkset data used by routing application 348 of SOM module 340. In Table 4, each entry includes a compound key or index that includes a linkset identifier and a signaling link field. Each entry also includes IMT address and communication port fields, which contain IMT bus address and communication port information associated with communication modules that are connected to IMT bus 312. More particularly, each entry in the linkset table includes an IMT address and communication port value associated with a communication module that supports the specific link identified by the key associated with the entry. For example, as shown in Table 4, link 0 of linkset 1 resides on a communication module that has an IMT bus address of 1305 and a communication port address of "A." Furthermore a link status field indicates that link 0 of linkset 1 is available for service. Also included in the linkset table is an adjacent point code (APC) field which contains information that identifies a signaling node adjacent to SMS off-load routing node 300, i.e., connected directly to the distant end of a signaling link that is also connected to SMS off-load routing node 300.

TABLE 4

SMS Off-load Linkset Data

| Linkset Name | Link | IMT/Card Address | Port | Link Status | Socket | Adjacent Point |
|---|---|---|---|---|---|---|
| LS1 | 0 | 1305 | A | A | Sock1 | 5-4-7 |
| LS1 | 1 | 1307 | B | U | Sock2 | 5-4-7 |
| LS2 | 1 | 1505 | B | A | Sock3 | 5-4-7 |
| LS2 | 2 | 2301 | A | A | Sock4 | 5-4-7 |
| LS5 | 0 | 3301 | A | A | Sock5 | — |
| LS5 | 1 | 3312 | B | A | Sock6 | — |
| LS8 | 1 | 1105 | A | A | Sock7 | 9-0-1 |

In one embodiment, SMS off-load module 340 performs a first database lookup in the SMS off-load routing table (Table 3). This lookup returns an index value or pointer that may be used in a second lookup in the linkset table (Table 4). The ultimate result of this two-stage lookup procedure is an IMT bus address, communication port, and TCP/IP socket identifier associated with a signaling link on a communication module. The TCP/IP socket identifier is subsequently used to obtain IP address information from Table 5 (shown below) prior to off-loading SMS messages from an A-interface to an IP network.

Table 5 shown below includes exemplary socket data for off-loading SMS messages to an IP network according to an embodiment of the present invention. In Table 5, each entry includes a socket identifier, local address and TCP port information, remote IP address and TCP port information, and socket status information. The socket identifier is used as a key to each entry. The IP address and port information may be used to build TCP and IP headers in packets used to off-load SMS messages. The socket status field indicates whether a socket is available or unavailable.

TABLE 5

Socket Data

| Socket | Local IP Address | Local TCP Port | Remote IP Address | Remote TCP Port | Socket Status |
|---|---|---|---|---|---|
| Sock1 | 10.01.01.10 | 13 | 10.20.01.01 | 34 | A |
| Sock2 | 10.01.01.10 | 14 | 10.20.01.02 | 43 | A |
| Sock3 | 10.01.01.10 | 15 | 10.20.01.03 | 76 | U |

TABLE 5-continued

Socket Data

| Socket | Local IP Address | Local TCP Port | Remote IP Address | Remote TCP Port | Socket Status |
|---|---|---|---|---|---|
| Sock4 | 10.01.01.10 | 16 | 10.40.01.01 | 56 | A |
| Sock5 | 10.01.01.10 | 17 | 10.40.01.02 | 55 | A |
| Sock6 | 10.01.01.10 | 18 | 10.50.01.01 | 83 | A |

The data structures shown in Tables 1–5 are merely illustrative data used to identify and off-load SMS messages from an A-interface to a data network. Alternate data and/or data structures may be used without departing from the scope of the invention.

A short message service off-load routing node of the present invention may receive messages and respond (on behalf of an MSC node) to certain types of signaling messages that are normally communicated between a BSC node and an MSC node via an A-interface link. In one embodiment, an SMO routing node may intercept signaling message packets that contain specific types of short message relay protocol (SM-RP) messages. For example, an SMO routing node may process received short message control protocol (SM-CP) signaling messages (e.g., CP-DATA messages) that include RP message components associated with mobile subscriber-to-MSC SMS communications. Table 6 shown below includes a listing of exemplary mobile originated RP messages and their associated RP message types.

TABLE 6

SM-RP Message Types

| RP MTI Bit Sequence | RP Message |
|---|---|
| 000 | RP-Data |
| 010 | RP-Ack |
| 100 | RP-Error |
| 110 | RP-SMMA |

In Table 6, the column labeled "RP MTI Bit Sequence" contains message type identifiers that SMS routing node 300 may use to identify SMS-RP data messages. The second column in Table 6 illustrates the corresponding message types. In the event that an SM-CP message is received from a BSC node and that message is targeted for off-loading from the core mobile SS7 signaling network, an SMO routing node of the present invention may terminate the CP message and generate one or more appropriate response messages.

Referring again to FIG. 4, in one embodiment, SMS off-load application 346 may include an SM-CP manager 350, a short message RP-to-MAP protocol translator 352, and a connection manager 354. SM-CP manager 350 administers or manages SM-CP related communication tasks, such as the SM-CP message termination and generation functionality mentioned above. RP-to-MAP protocol translator 352 may generate specific SMS-related MAP signaling messages in response to the receipt of predetermined SM-CP-encapsulated RP messages. For example, if a CP-DATA message including a mobile-originated RP-DATA component is received, RP-to-MAP translator 352 may generate an associated MAP ForwardMOShortMessage message. The ForwardMOShortMessage message may be routed to a destination SMSC via an off-load network. Similarly, a MAP ReadyForShortMessage signaling message may be generated in response to receiving a CP-DATA signaling packet containing a mobile-originated RP-SMMA message. SM-CP manager 350 may generate a CP-ACK message in response to a received CP-DATA message and route the CP-ACK message back to the originating BSC node. SM-CP manager 350 thus maintains state information associated with a particular SM-CP connection or transaction, and manages the connection accordingly. SM-CP manager 350 may also generate CP-Error messages. Thus, SM-CP manager 350 facilitates and administers SM-CP-protocol-based communications with a peer network element (e.g., a BSC node) on behalf of the SMO routing node.

SMS off-load application 346, SM-CP manager 350, short message RP-to-MAP protocol translator 352 and connection manager 354 cooperate to receive and respond to incoming SMS-related MAP messages originated by an SMSC, as described above. For example, RP-to-MAP protocol translator 352 and SM-CP manager 350 may generate a CP-DATA message containing an RP-ACK component in response to the receipt of a MAP ForwardMOShortMessage_Response message from an SMSC. With particular regard to an RP-Error message and the associated MAP ForwardShortMessageError message, short message RP-to-MAP protocol translator 352 may also translate RP error codes or cause values to the equivalent MAP error codes. For example, an RP-Error cause value of "22" may be translated to a MAP ForwardShortMessageError "Memory-CapacityExceeded" error code.

The SM-CP and SM-RP protocols, are described in detail in European Telecommunications Standards Institute (ETSI) TS 100 942 v7.0.0 (1999–08) Digital cellular telecommunications system (Phase 2+); Point-to-Point (PP) Short Message Service (SMS) support on mobile radio interface (GSM 04.11 version 7.0.0 Release 1998, the disclosure of which is incorporated herein by reference in its entirety. Exemplary SMS-related MAP messages are described in detail in ETSI TS 100 974 v7.6.0 (2000–09) Digital cellular telecommunications system (Phase 2+); Mobile Application Part (MAP) specification (3GPP TS 09.02 version 7.6.0 Release 1998), the disclosure of which is incorporated herein by reference in its entirety.

Figure 5A:
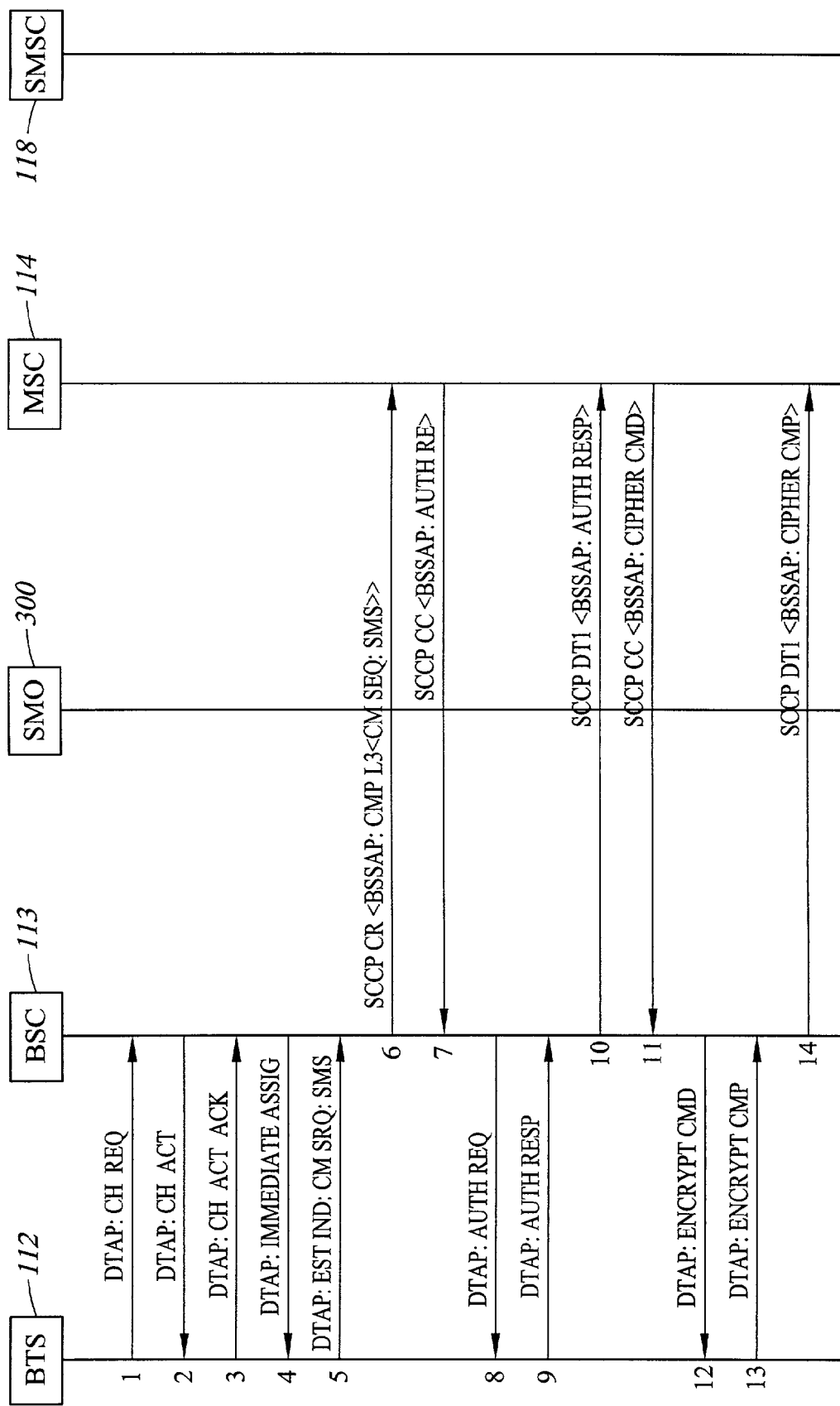
FIG. 5 is a message flow diagram illustrating exemplary SMS-related signaling message communications in an SMS transmission scenario according to an embodiment of the present invention.
Figure 5B:
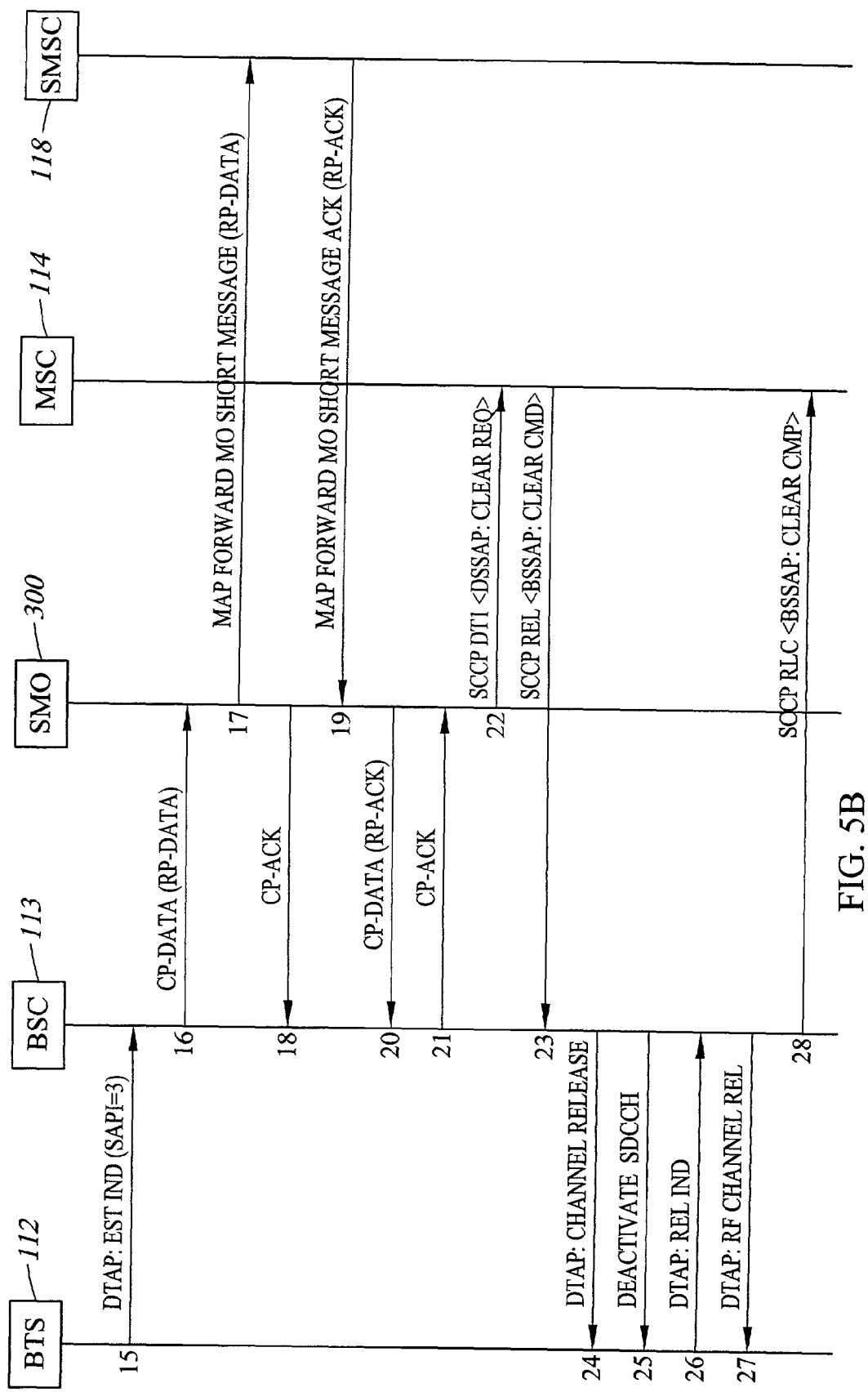

FIG. 5 is an inter-node messaging diagram illustrating the sequenced flow of signaling messages associated with the sending of a mobile originated short message by a mobile subscriber in a network environment where authentication and encryption services are used during SMS communications. FIG. 5 includes a base transceiver station (BTS) node 112, a BSC node 113, an SMO routing node 300, an MSC node 114, and an SMSC node 118.

In FIG. 5, a number of non-SMS-specific signaling messages are required during the course of a typical mobile-originated short message communication. Lines 1–5, 8, 9, 12, 13, 15, and 24–27 in FIG. 5 illustrate exemplary DTAP messages that may be exchanged between BSC 113 and MSC 114 that are unrelated to SMS service. Since these messages are not processed by SMS routing node 300, these messages will not be described in detail herein. Similarly, lines 6, 7, 10, 11, 14, 23, and 28 are SCCP messages that are through switched by SMS routing node 300. Accordingly, a detailed description of these messages will likewise not be presented herein.

In line 16 of the message flow diagram illustrated in FIG. 5, SMO routing node 300 receives a CP-data message including an RP-data component on an A-interface from BSC 113 and terminates the CP-Data message. This message would normally be sent from BSC 113 to MSC 114 to trigger the originating of a MAP ForwardMOShortMessage (RP-data) message. However, according to the present embodiment, in line 17 of the message flow diagram, SMO routing node 300 generates its own MAP ForwardMOShortMessage (RP-data) and forwards the message to SMSC 118. The message may be sent over an SS7 network, an IP network, or any other type of packet-based network capable of carrying MAP messages. In line 18 of the message flow diagram, SMO routing node 300 acknowledges the CP-data message generated by BSC 113 in line 16 of the message flow diagram. Such acknowledgement is normally performed by the MSC. In line 19 of the message flow diagram, SMO routing node 300 receives a MAP ForwardMOShortMessage acknowledgement message from SMSC 118. In line 20 of the message flow diagram SMO routing node 300 sends a CP-data acknowledgement message including an RP-data acknowledgement component to BSC 113. In line 21 of the message flow diagram, BSC 113 sends a CP-acknowledgement message to SMO routing node 300. In line 22 of the message flow diagram, SMO routing node 300 sends an SCCP DT1 message including a BSSAP clear request component to free resources on MSC 114. Thus, as illustrated in FIG. 5, SMO routing node 300 intercepts short message service messages destined for an MSC and formulates response messages that would normally be generated by the MSC. Accordingly, the processing load on the MSC is reduced.

Figure 6:
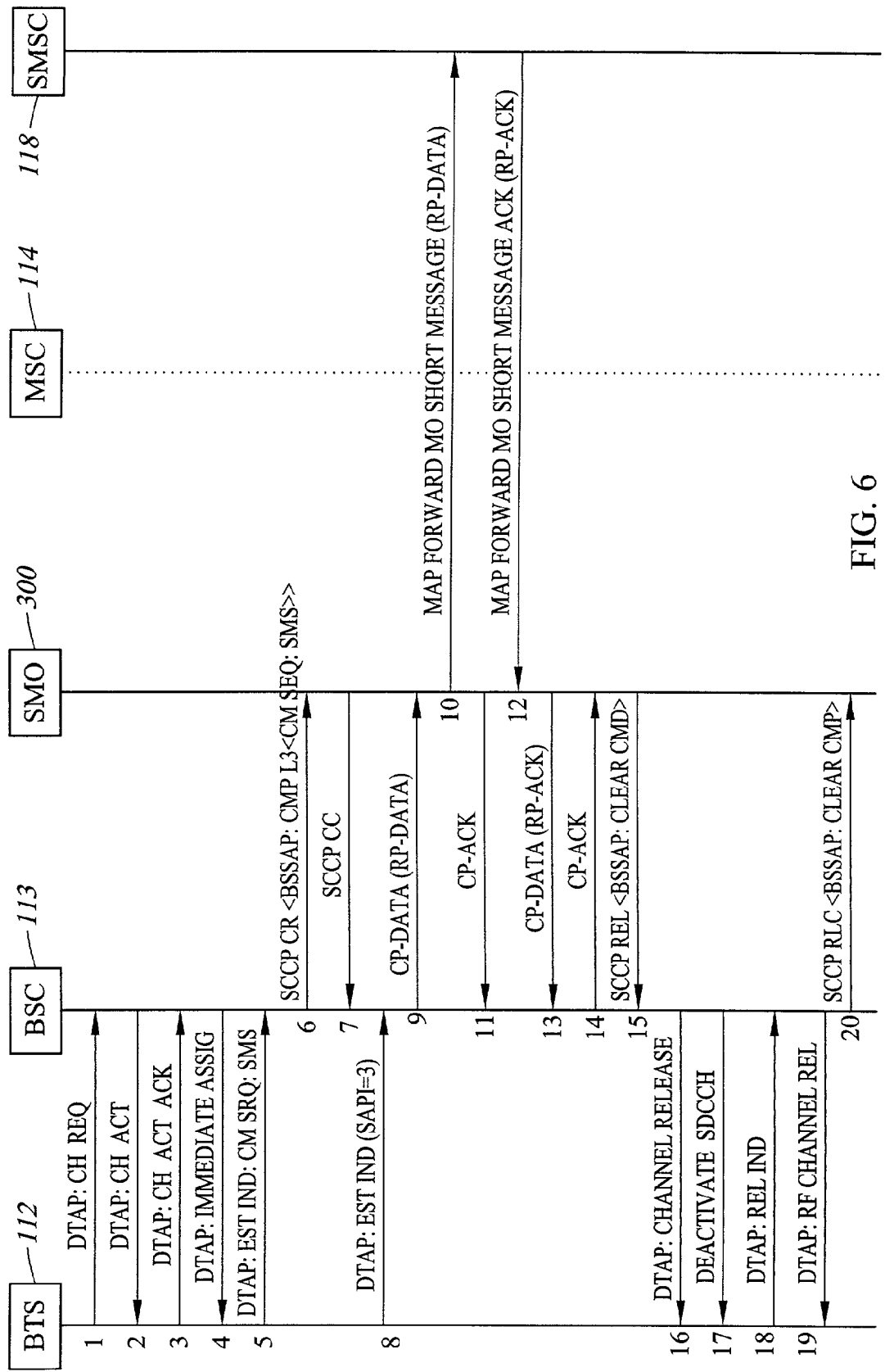
FIG. 6 is a message flow diagram illustrating exemplary SMS-related signaling message communications in another SMS transmission scenario according to an embodiment of the present invention.

FIG. 6 is a message flow diagram illustrating messages associated with the origination of a short message service message where SMO routing node establishes an SCCP connection on behalf of an MSC. In FIG. 6, lines 1–5 illustrate DTAP messages exchanged between BTS 112 and BSC 113 in order to establish a communication channel on the BSC for delivering an SMS message. These messages are not important in explaining the invention and hence will not be described in detail herein.

In line 6 of the message flow diagram, BSC 113 sends an SCCP connection request message to MSC 114. However, rather than forwarding the SCCP connection request message to MSC 114, SMO routing node 300 intercepts the SCCP connection request message and forwards an SCCP connection confirm message to BSC 113. The SCCP connection confirm message confirms the availability of resources at an MSC to send an SMS message. However, because SMO routing node 300 intercepts SMS messages on the A interface that are destined for MSC 114, SMO routing node 300 can confirm the availability of resources for sending the message. In steps 9–14, SMO routing node 300 performs the CP-data and MAP functions described above with respect to FIG. 5 to deliver an SMS message to SMSC 118 without involving MSC 114. In line 15 of the message flow diagram, SMO routing node 300 sends an SCCP release message to BSC 113 to release resources associated with the SMS message. In lines 16–19 of the message flow diagram, BSC 113 and BTS 112 exchange DTAP messages for releasing the channel associated with the SMS message. Finally, in line 20, BSC 113 sends an SCCP release complete message to SMO routing node 300. Thus, FIG. 6 illustrates that SMO routing node 300 can reserve channel resources and subsequently deliver an SMS message on behalf of an MSC.

SMS off-loading application 346 illustrated in FIG. 4 resides within a signal transfer point or signaling gateway type routing node. In an alternate embodiment of the invention, SMS off-loading application 346 may reside on an external workstation, indirectly coupled to IMT bus 304 of the routing node. Such an embodiment is illustrated in FIG. 7, which includes an SMS off-load-enabled signaling message router that is generally indicated by reference numeral 400.

The internal communications and control architecture of routing node 400 is similar to that described above for node 300, and as such will not be discussed in detail again. However, in the embodiment presented in FIG. 7, SMS off-load routing node 400 includes an external SMS off-load processing (ESP) platform 500 that receives SMS messages from the core routing node communications sub-system via an Ethernet (or functionally similar) connection. As such, SMS off-loading application 346 described above is resident on the ESP platform 500, including applications 350, 352, and 354 (not shown). In this case, SMS off-loading application 346 is coupled to SMS off-loading module 340 via an Ethernet controller (EC) 502 located on SOM 340 and another EC 504 located on ESP platform 500. The communication of information via an Ethernet connection is well known to those skilled in the art, and consequently a detailed discussion of Ethernet controllers 502 and 504 is not presented herein. Ethernet controllers 502 and 504 communicate SMS messages received at SOM 340 to the ESP platform 500, and vice versa.

Figure 7:
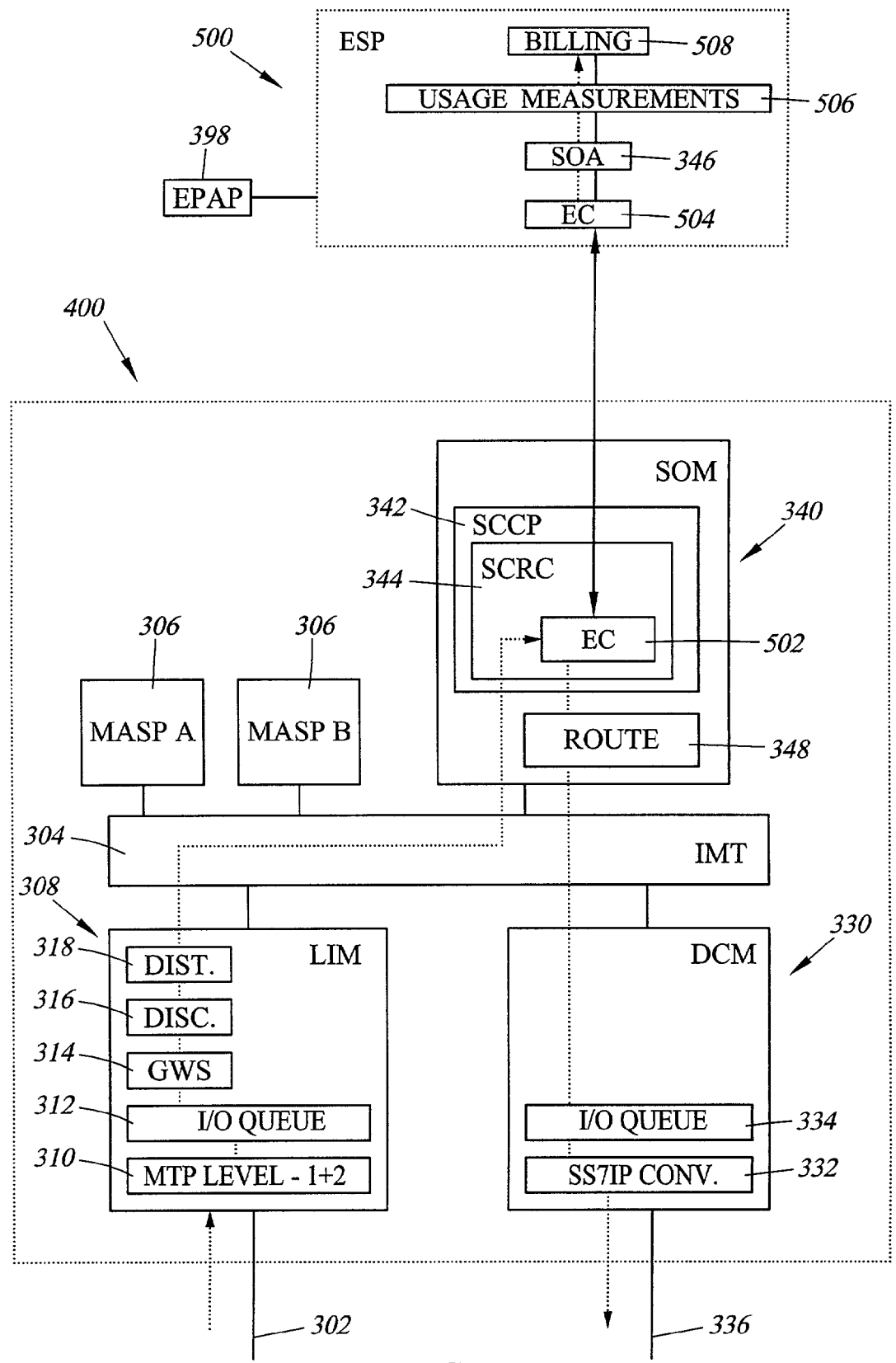
FIG. 7 is a schematic diagram of an SMS off-load routing node including an external short message off-load processing and billing platform according to an embodiment of the present invention.

In the embodiment shown in FIG. 7, ESP platform 500 also includes databases and applications for performing usage measurements and billing functions related to the off-loading of SMS messages. An example of such usage measurements and billing information that may be collected by ESP platform 500 is shown in Table 7.

TABLE 7

SMS Off-load Usage Measurements and Billing Data

| Date | Time | SMSC Entity | MS ID | DPC |
|---|---|---|---|---|
| Dec. 1, 2000 | 13:01:24 | 9195555506 | 9194671100 | 5-5-5 |
| Dec. 1, 2000 | 13:01:26 | 9195555506 | 9194621450 | 5-5-5 |
| Dec. 1, 2000 | 13:01:34 | 9195555507 | 9194671230 | 5-5-6 |

The sample usage measurements and billing data structure presented in Table 7 includes date and time stamp fields, an SMS message receiving SMSC entity identifier field, an SMS message sending mobile subscriber identifier field (e.g., originating mobile subscriber MSISDN, IMSI, electronic mail address, etc.), and an SMS message destination point code address field. In one embodiment of the present invention, such information may be maintained for SMS messages that are off-loaded from the core mobile SS7 switching network by the SMS off-load routing node. This information may subsequently be used for network management and/or billing purposes. The UMB data structure shown in Table 7 is merely illustrative of the types of information that may be tracked by a usage measurements and billing application that operates in conjunction with an SMS off-load application of the present invention. Other data structures or message peg counting techniques may be used without departing from the scope of the invention.

SMS Off-Load Operation

Figure 8:
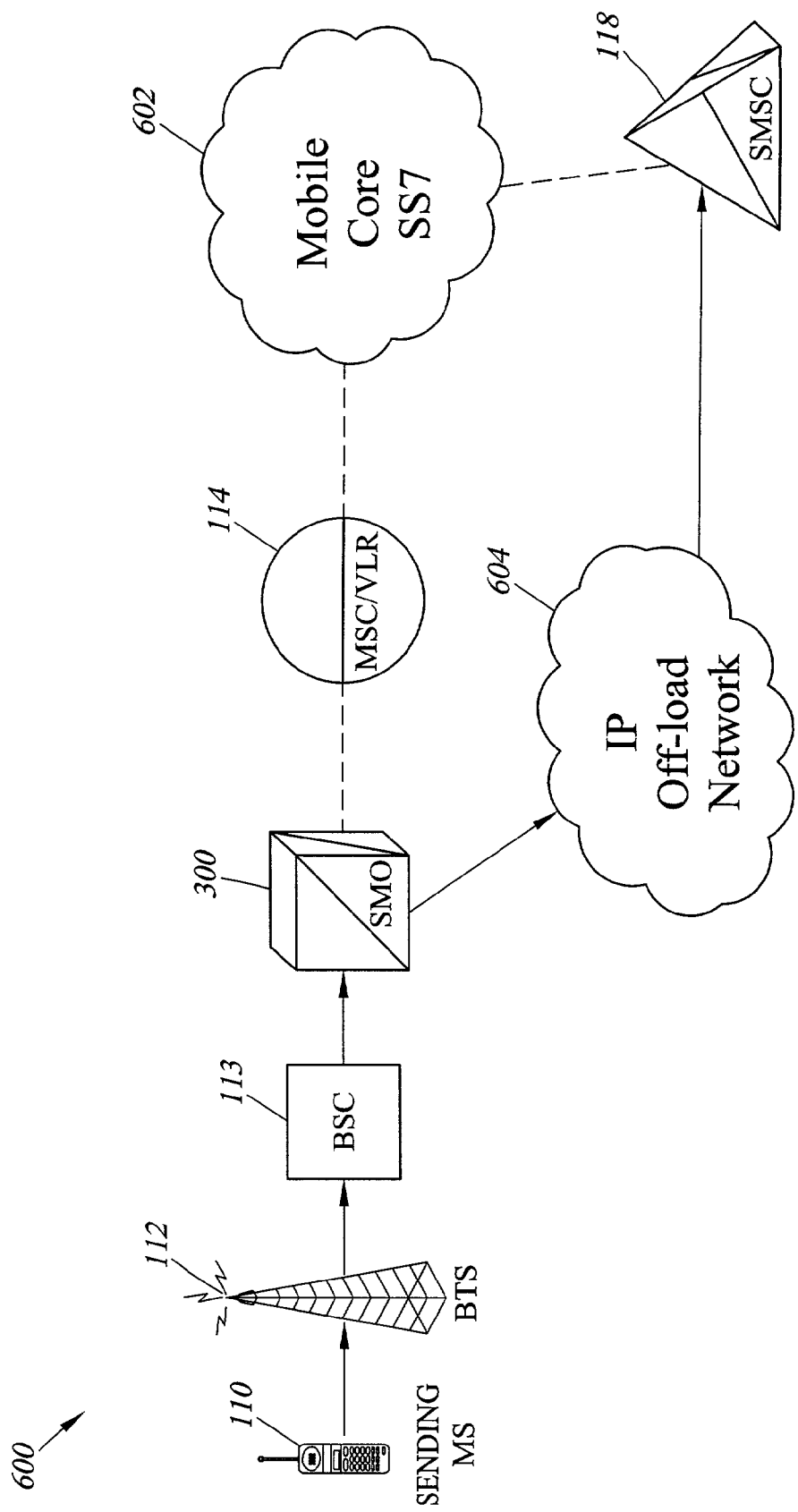
FIG. 8 is a network diagram including a short message off-load routing node according to an embodiment of the present invention.

FIG. 8 is a network diagram including an SMO routing node according to an embodiment of the present invention. In FIG. 8, a wireless communication network 600 includes a short-message-originating mobile subscriber 110, a base station transceiver system 112, a base station controller 113, a short message off-load routing node 300, a serving mobile switching center/visitor location register node 114, a short message service center node 118, a mobile core signaling system 7 signaling network 602, and an Internet protocol based off-load network 604. The message flow diagram presented in FIG. 6 can be used in conjunction with FIGS. 4 and 8 to generally illustrate the steps associated with SMS off-load processing of an SMS message according to one embodiment of the present invention. For purposes of illustration, only those signaling messages directly associated with communications between SMO routing node 300, BSC node 113, and the SMSC node 118 are described in the following example.

When a mobile subscriber 110 attempts to send a short message, BSC node 113 sends an SCCP Connection Request message to MSC node 114 via an A-interface signaling link. The SCCP ConnectionRequest message is received via link interface module 308 and is subsequently screened by LIM discrimination application 316. If discrimination application 316 determines that the received message does not require SMS off-load processing, the message may be routed from SMO node 300 via a communication module, such as a LIM without further SMS off-load processing. Upon determining that the received message is an SCCP message (e.g., service indicator value=3 as is the case in this example, discrimination application 316 passes the message to distribution application 318 where the message is internally routed via IMT bus 304 to the short message off-load processing module 340. SCRC 344 examines the contents of the received SCCP signaling packet and determines to which of the applications associated with SOA 346 the packet should be forwarded. SCRC 344 may examine a variety of parameters in order to make such a determination. For instance, in one embodiment, SCRC 344 may examine a CdPA SSN field in a received message. A CdPA SSN binary value of "11111110" indicates that the SCCP message contains BSSAP type information, and a discriminator parameter contained in a BSSAP header may subsequently be examined to determine the type of message/data components contained therein. For example, a BSSAP discrimination parameter binary value of "01" is typically used to indicate the presence of a DTAP information component, and SMS information is generally transported within DTAP type BSSAP messages.

Returning to the present example, the received message may include information (e.g., CM_seq parameter=SMS), which indicates that the message is related to SMS connection/communication channel resource management. The message is thus passed to connection manager 354 for processing. Connection manager 354 processes the ConnectionRequest message and, in response, generates an SCCP ConnectionConfirm message addressed to the originating BSC node 113. This new ConnectionConfirm message is routed via routing 348 to an appropriate A-interface LIM module for transmission to BSC node 113. As such, the SCCP ConnectionRequest message is effectively intercepted and terminated by the SMO node 300 prior to receipt of the message by MSC node 114.

After receiving the ConnectionConfirm message, BSC node 113 sends an SMS CP-DATA message to MSC node 114. Again, prior to receipt of the CP-DATA message by MSC node 114, the message is intercepted by SMO routing node 300. The CP-DATA message is received by LIM 308 and directed to SOM 340 for short message off-load processing. In this case, the CP-DATA message is determined to contain a short message relay protocol "data" (RP-DATA) component and as such, the message is passed to the short message control protocol manager (SM) 350 for processing.

After successfully verifying the CP-DATA message, SM 350 generates a CP-ACK response message which is routed by routing application 348 to an appropriate A-interface LIM module for transmission to BSC node 113. The CP-DATA message is then passed to the short message relay protocol-to-mobile application part translator 352. Translator 352 examines the RP-DATA component of the CP-DATA message and generates an appropriate MAP message. More particularly, an RP message type indicator (RP-MTI) parameter contained in the SM-RP layer of the signaling message is examined to determine the type of RP message contained therein. For example, an RP-MTI binary value of "000" is used to indicate an RP-Data message that was originated by a mobile subscriber, whereas an RP-MTI value of "001" indicates an RP-Data message that is destined to a mobile subscriber. Table 6 presented above includes a listing of possible RP-MTI values and their associated mobile originated RP message types that may be used by translator 352 in identifying and translating RP messages.

In this example, the MAP message generated by translator 352 is a ForwardMOShortMessage message. Unlike the previously generated signaling messages, which were routed via the A-interface back to BSC node 113, the new MAP message is routed via routing application 348 to an appropriate IP network interface module 330 for transmission to or towards SMSC node 118 via the IP off-load network 604. In one embodiment, communication DCM 330 may encapsulate signaling messages to be off-loaded in an transport adapter layer interface packet which is subsequently transmitted into an off-load network via a TCP/IP socket connection. As discussed above, the present invention is not limited to using the TALI protocol to off-load SMS messages. Any protocol for transmitting SMS messages over a packet-based network may be used.

With particular regard to RMT processing, an SMSC entity address contained within the received SCCP CP-DATA message may be used in conjunction with the SMS off-load screening data presented above in Table 1 to determine the intermediate or final destination address of the MAP message being off-loaded. Once the destination address is determined, route and linkset data tables (Tables 3 and 4 are may be used to select a specific signaling route and linkset. Translator 352 may extract an IMSI, TMSI, or functionally equivalent mobile subscriber identifier from the received SCCP CP-DATA packet and determine the associated MSISDN identifier using data contained in IMSI/TMSI mapping table (Table 2) described above. The appropriate MSISDN identifier is included in the MAP message that is off-loaded to SMSC node 118. Again, it should be noted that MSC node 114 is not involved in the generation and subsequent routing of either the CP-ACK or MAP ForwardMOShortMessage signaling messages. As a result, the processing load on the MSC is decreased.

Turning briefly to the SMO routing node embodiment illustrated in FIG. 7, external SMS off-loading platform 500 in combination with the internal SMS off-load module 340 provides essentially the same short message off-loading functionality as described in the previous embodiment. However, ESP 500 is further to generate and maintain usage measurements and billing information related to the off-loading of SMS messages from the (core mobile SS7 signaling network 602. As such, within SMO routing node 400, a received SMS signaling message packet is processed by LIM 308 in the manner described above. Once the received signaling message packet is identified as potentially requiring SMS off-load processing by LIM 308, the message is internally routed via IMT bus 304 to SOM 340 for further examination. SCCP and SCRC processes 342 and 344, perform the SCCP functions described above. In the event that processing by the short message off-load application 346 is indicated, SCRC process 344 directs the message to Ethernet controller 502, which transmits the message to EC 504 residing on ESP 500. Once EC 504 receives the message, EC 504 directs the message to SOA 346 where short message off-load processing is performed. In FIG. 6, SOA 346 may communicate information extracted from the SMS message to the usage measurements and billing applications 506 and 508, respectively. As such, usage measurements application 506 and billing application 508 may generate and maintain statistics and billing information (e.g., the information shown in Table 7). Once again, with respect to RP-to-MAP message translation/generation, SOA 346 generates a MAP-based SMS response message, as described above. The resulting MAP message generated by SOA 346 is subsequently communicated Ethernet controllers 504 and 502 back to SOM 340 and ultimately via IMT bus 304 to DCM 330 for transmission into off-load network 604.

Returning to the sample message sequence diagram shown in FIG. 6, it will be appreciated that a MAP ForwardMOShortMessage_Ack or response message is sent by SMSC node 118 in response to the receipt of the associated MAP ForwardMOShortMessage. SMO routing node 300 receives the MAP ForwardMOShortMessage_Ack message and internally routes the message to SOM 340 for processing. In response to the receipt of such a MAP ForwardMOShortMessage_Ack message, SOA 346 generates a CP-DATA message, which is internally routed via routing 348 to an appropriate A-interface LIM module for transmission to BSC node 113. BSC node 113 receives the CP-DATA message and, in response, generates an associated CP-ACK message that is transmitted back to SMO routing node 300. As described above, this CP-ACK message is received by SMO node 300 and internally routed to SOA 346. In this case, short message control protocol manager 350 notifies the connection manager (CM) 354 that the SMS communication session is complete. In response, CM 354 generates an SCCP CONNECTION_RELEASE message that is intended to inform BSC node 113 that the connection/communication channel resources associated with this SMS transaction are no longer required and consequently may be released. Upon receipt of the SCCP CONNECTION_RELEASE message, BSC node begins the process of releasing the associated connection/communication channel resources and subsequently sends an SCCP CONNECTION_RELEASE_COMPLETE message which is received and processed by SMO routing node 300.

A number of protocols may be used to transport an off-loaded signaling message through an off-load network, including SCCP user adaptation (SUA) over stream control transmission protocol (e.g., as described in IETF RFC 2960, the disclosure of which is incorporated herein by reference in its entirety) M2UA/SCTP, M3UA/SCTP, GPRS, etc. Regardless of the encapsulating protocol employed, an SMO routing node of the present invention is adapted to intercept certain SMS related signaling messages prior to their reaching a serving MSC node and subsequently respond to these messages in a manner that is similar to the response normally provided by the serving MSC. However, instead of routing the signaling messages generated in response to these intercepted SMS messages via the normal core mobile SS7 signaling network, an SMO routing node of the present invention routes the signaling messages generated in response to these intercepted SMS messages via an off-load network. As such, one of the primary objectives of an SMO routing node is to provide a method by which a wireless network operator can divert SMS messages originated by mobile subscribers within the their network around the MSC nodes that are servicing those mobile subscribers. To accomplish this objective within the context of current GSM wireless network architectures, such SMS message diversion preferably occurs on the A-interface links that connect BSC nodes to MSC nodes. In conjunction with this objective, it will be appreciated that an equally important consideration is the ability of an SMO routing to perform the desired SMS off-loading function in a manner that is transparent to other elements in the core SS7 network component of the wireless network, particularly the MSC node from which the SMS messaging traffic is being diverted. Because the present invention off-loads traffic upstream from the MSC, the processing load on the MSC caused by SMS traffic is reduced.

It will be understood that various details of the invention may be changed without departing from the scope of the invention. Furthermore, the foregoing description is for the purpose of illustration only, and not for the purpose of limitation—the invention being defined by the claims.

What is claimed is:

1. A network routing element for routing short message service (SMS) related signaling messages in a wireless communications network, the network element comprising;
    (a) a first communications module for receiving, on an A-interface signaling link, messages from a base station controller (BSC);
    (b) a discrimination application for determining whether the messages include a short message control protocol (SM-CP) component;
    (c) an SMS off-load application for receiving messages from the discrimination application that include an SM-CP component and, in response, generating response messages using information extracted from the received messages; and
    (d) a second communications module for encapsulating the response messages in data network packets and transmitting the network packets to a node in a data off-load network.

2. The network element of claim 1 wherein the first communications module is a signaling system 7 (SS7 link interface module.

3. The network element of claim 1 wherein the discrimination application is located on the first communications module.

4. The network element of claim 1 comprising a third communications module coupled to the first and second communications modules, wherein the discrimination application is located on the third communications module.

5. The network element of claim 1 wherein the SMS off-load application is adapted to determine the message type of a received SM-CP message.

6. The network element of claim 1 wherein the SMS off-load application is adapted to determine the message type of a short message relay protocol (SM-RP) component contained within a received SM-CP message.

7. The network element of claim 1 wherein the SMS off-load application is adapted to generate, using information extracted from a received SM-CP message packet, a second message including a mobile application part (MAP) component.

8. The network element of claim 7 wherein the MAP component includes a ForwardMOShortMessage signaling message.

9. The network element of claim 1 wherein the second communications module is an IP-capable data communication module (DCM) for transmitting the response messages over an IP off-load network.

10. The network element of claim 9 wherein the second communications module is adapted to encapsulate the response messages in a transport adapter layer interface (TALI) packets prior to transmitting over the IP network.

11. The network element of claim 1 wherein the discrimination application is adapted to determine whether the messages are related to mobile communication connection management services.

12. The network element of claim 1 wherein the SMS off-load application is adapted to perform connection management services.

13. The network element of claim 12 wherein the SMS off-load application is adapted to receive, process, and respond to connection management messages sent from the BSC.

14. The network element of claim 1 wherein the SMS off-load application is adapted to generate a response messages including an SM-CP message component.

15. The network element of claim 14 wherein the response messages are routed to the BSC via an A-interface signaling link.

16. The network element of claim 1 wherein the second communications module is adapted to transmit the response messages over a general packet radio services (GPRS) network.

17. A method for off-loading short message service (SMS) messages from a core mobile signaling network, the method comprising:
(a) receiving, on an A-interface signaling link, a first signaling message from a base station controller (BSC);
(b) determining whether the first signaling message includes a short message relay protocol (SM-RP) component;
(c) in response to determining that the first signaling message contains an SM-RP component, generating a second signaling message; and
(d) routing the second message towards a destination via an off-load network.

18. The method of claim 17 wherein the first message includes an SS7 signaling connection control part (SCCP) component.

19. The method of claim 17 wherein determining whether the first signaling message includes an SM-RP component includes determining whether the first signaling message contains an SM-RP-DATA message.

20. The method of claim 17 wherein generating a second message includes generating a MAP ForwardMOShortMessage message.

21. The method of claim 17 wherein generating a second message includes generating a MAP ReadyForShortMessage message.

22. The method of claim 17 wherein routing the second message towards a destination via an off-load network includes routing the second message towards the destination without involving a mobile switching center (MSC) coupled to the BSC via the A-interface.

23. The method of claim 17 wherein routing the second message towards a destination via an off-load network includes routing a MAP message towards the destination via an Internet protocol (IP) network.

24. The method of claim 17 wherein routing the second message towards a destination via an off-load network includes encapsulating the second message in a transport adapter layer interface (TALI) packet.

25. The method of claim 17 including determining whether the first signaling message includes a short message control protocol (SM-CP) component.

26. The method of claim 25 comprising, in response to determining that the first signaling message includes an SM-CP component, generating an SM-CP response message and routing the SM-CP response to the BSC.

27. The method of claim 17 including determining whether the first signaling message includes a connection management (CM) component.

28. The method of claim 27 comprising, in response to determining that the first signaling message includes an CM component, generating a CM response message and routing the CM response to the BSC.

29. The method of claim 17 wherein the off-load network is a general packet radio services (GPRS) network.

30. A method for reducing short message service (SMS) message routing resource requirements at a mobile switching center (MSC) in a wireless communications network, the method comprising;
(a) Intercepting, upstream from a mobile switching center, a first signaling message originated by a base station controller (BSC) in a wireless communication network;
(b) determining whether the first signaling message is a short message control protocol (SM-CP) DATA message;
(c) in response to determining that the first message is an SM-CP data message, terminating the SM-CP-DATA message and generating a second message; and
(d) routing the second message towards a destination via an off-load network such that the second message is delivered without involving the MSC.

31. The method of claim 30 wherein intercepting the first signaling message includes receiving the first signaling message on an A-interface signaling link.

32. The method of claim 30 wherein terminating the SM-CP-DATA message includes generating an SM-CP-ACK message and routing the SM-CP-ACK message to the originating BSC node.

33. The method of claim 30 wherein generating a second message includes generating a MAP ForwardMOShortMessage message.

34. The method of claim 30 wherein generating a second message includes generating a MAP ReadyForShortMessage message.

35. The method of claim 30 wherein routing the second message towards a destination via an off-load network includes encapsulating the MAP message in an Internet protocol (IP) packet.

36. The method of claim 30 wherein routing the second message towards a destination via an off-load network includes encapsulating the MAP message in one or more asynchronous transfer mode (ATM) cells.

37. The method of claim 30 including determining whether the first signaling message includes a connection management (CM) component.

38. The method of claim 37 where in response to determining that the first signaling message includes an CM component, generating a CM response message and routing the CM response message the originating BSC.

39. The method of claim 30 wherein the off-load network is a general packet radio services (GPRS) network.

* * * * *